Feb. 29, 1972  J. A. WIEDEMAN  3,646,189

SELF-COLLAPSING CONTAINER FORMING METHOD

Original Filed Oct. 18, 1966

INVENTOR
JOHN A. WIEDEMAN
BY
ATTORNEY

United States Patent Office 3,646,189
Patented Feb. 29, 1972

3,646,189
SELF-COLLAPSING CONTAINER FORMING
METHOD
John A. Wiedeman, New York, N.Y., assignor to Polymer Sciences Corporation, New York, N.Y.
Continuation-in-part of application Ser. No. 736,515, May 12, 1968, which is a division of application Ser. No. 587,571, Oct. 18, 1966, now Patent No. 3,401,837. This application Feb. 16, 1970, Ser. No. 11,763
Int. Cl. B29c 23/12, 23/20
U.S. Cl. 264—295
9 Claims

ABSTRACT OF THE DISCLOSURE

A method for the fabrication of a collapsible thermoplastic container for fluid material. A collapsible thermoplastic container is formed from a thermoplastic material having a high tensile modulus. The container includes a chamber defined by a pair of side walls and an end wall, the side and end walls having a retractile memory. The container is deformed into a helical configuration and then heated to an elevated temperature for a time period sufficient to heat-set the thermoplastic conainer in a permanent coil configuration.

CROSS-REFERENCES TO RELATED APPLICATIONS

This application is a continuation-in-part of copending application, Ser. No. 736,515, filed May 12, 1968, now abandoned which in turn is a division of application, Ser. No. 587,571, filed Oct. 18, 1966 and now U.S. Pat. No. 3,401,837.

BACKGROUND OF THE INVENTION

This invention relates to a method for the fabrication of thermoplastic containers. More particularly, the present invention relates to a method for the fabrication of collapsible thermoplastic containers of the type used to contain and dispense toothpaste, creams, medicaments and any similar viscous substances, such containers including means for facilitating the dispensing of the contents thereof.

In recent years, a considerable degree of interest has been generated in the chemical industry for a class of compositions termed "thermoplastic materials", polyethylene and polypropylene being prime examples of such compositions. The inherent advantages of these materials, namely, chemical inertness with respect to contents, ease of ornamentation and nominal cost became evident to workers skilled in the packaging arts and in the years following, resulted in an industrial revolution in the packaging industry.

At an early stage in this revolution, the feasibility of utilizing such materials for packaging toothpaste, cosmetics and the like was recognized. Unfortunately, a major prior art difficulty has been the efficient evacuation of the contents of the container. Thus, the normal evacuation or dispensing procedure involves the application by manual means of external pressure, and in order to assure maximum evacuation the container must be continually squeezed in an inverted position or rolled end upon end (as in the case of thin walled tubes). Unfortunately, neither of those procedures has proven to be entirely satisfactory due to entrapment of contents or drawing in of air with subsequent lack of control in dispersing. More recently, a major manufacturer of toothpaste containers sought to overcome the noted prior art limitations by furnishing the consumer a slotted key member which facilitates the roll-up process. However, entrapment of contents as well as air intake still obtain.

U.S. Pat. No. 2,852,143, to Taber, relates to a display device suitable for the merchandising and display of bottles in carriers. The device comprises a plurality of flexible sheet elements secured to the rear wall of the device which may be pulled out atop one layer of articles and serves as a supporting member for another layer of articles. Each supporting member has a permanent coil configuration to which it returns when all articles stacked thereon have been removed. Taber, however, is concerned solely with flat or horizontal thermoplastic shelving that rolls up when items contained thereon are removed and does not concern the problem of evacuation of fluid materials from a container.

U.S. Pat. No. 3,271,490 to Cattaneo discloses a prior art technique for the fabrication of collapsible tubes for dispensing fluent materials which involves annealing the convexity of the outer surface of at least part of one axial half of a body portion of a tube so that it rests adjacent a corresponding part of the other axial half of the tube body. This end is attained by introducing a suitable plastic material into the described apparatus and after performing a series of minor mechanical maneuvers, a portion referred to as an axial half of the tubular member of interest is subject to heat and a slight vacuum so as to cause a concavity along the opposite axial half of the tubular member, such concavity being comprised of the aforementioned axial half. Upon filling, the tube resumes to normal shape and when evacuated it reverts to the concave-convex form. After the removal of the contents from the container, however, the fluid contents and air may remain entrapped.

SUMMARY OF THE INVENTION

In accordance with the present invention, the prior art limitations described are effectively obviated by a method which produces a novel container which automatically collapses as the contents thereof are dispensed. More specifically, the novel container is constructed in such manner that the walls thereof exert an internal pressure upon the content material so that when the discharge outlet is opened the content material may be dispensed with the concurrent collapse of the container. Application of the desired internal pressure is effected in accordance with the invention by generating an innate force in the container walls prior to filling so that the content material may be evenly advanced through the container and out of the discharge outlet upon removal of the cap, thereby resulting in the automatic collapse of the container. This end is attained by selecting a pliant container material capable of having a retractile memory generated therein, forming the container configuration of interest and heating the resultant container to an elevated temperature below the melting point thereof for a time period usually ranging up to about five minutes, thereby generating the desired retractile memory in the material, the so treated container then being ready for filling.

Broadly speaking, the process of the present invention involves the fabrication of a collapsible thermoplastic container for fluid material by the steps of forming a collapsible thermoplastic container from a thermoplastic material having a high tensile modulus, the container including a chamber defined by a pair of side walls and an end wall, the side and end walls having a retractile memory. The container is deformed into a helical configuration and then heated to an elevated temperature below the melting point thereof for a time period usually ranging up to about five minutes, thereby resulting in heat-setting of the thermoplastic container in a permanent coil configuration.

It will be understood by those skilled in the art that the present invention is described for convenience largely in terms of tube contents wherein the container is a cylinder of oval cross-section closed at one end by a crimp and at the other end by a cap of the stopper type. However, the invention is by no means limited to this type of container. Any thermoplastic container may be constructed as described herein. For example, the configuration of the container utilized may take the form of a rectangle or any other polygonal form with or without neck portions.

DESCRIPTION OF THE PREFERRED EMBODIMENTS

Figure 1:
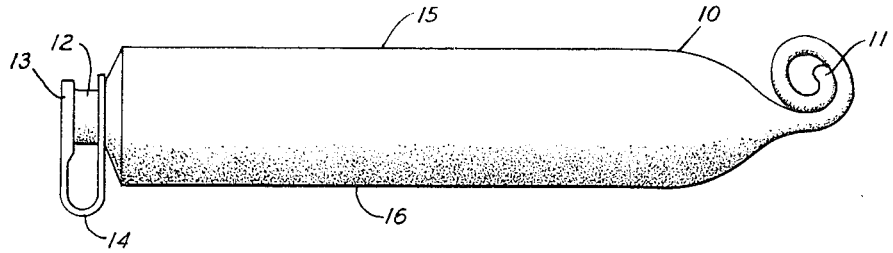
FIG. 1 is a side elevational view of a typical container constructed in accordance with the invention.

With reference now more particularly to the drawing wherein like numerals denote corresponding parts, a collapsible container of the type normally utilized to contain toothpaste and the like is shown. As shown in the figures, container 10 is essentially a cylinder of oval cross-section constructed of a thermoplastic material and has one end sealed as at 11 and the other or discharge end wall provided with a neck portion 12. The discharge end wall has a container opening therein. A stopper means is secured in neck 12 in order to prevent the inadvertent escape of contents therethrough until removed by pulling upon tab 13 secured thereto, tab 13 being fastened to neck 12 by means of an elongated ribbon 14.

As indicated, in order to obtain a container so constructed as to collapse automatically upon opening of the discharge outlet a retractile memory or pre-stress force must be generated in the walls 15 and 16 of container 10, thereby compelling end 11 to coil upon itself as the tube contents are evacuated, the fluid contents being constantly constrained in a direction toward the container opening. This effect is attained by winding the thermoplastic container, prior to filling, in coil form either about itself or around a mandrel and subjecting it to a controlled heat treatment, thereby imparting a permanent coiled configuration thereto.

The thermoplastic material selected for use in the practice of the present invention is preferably chose from among those materials manifesting high tensile moduli, that is, a high ratio of stress to strain in the elastic range of the material. The tensile modulus is a determining factor in the degree of retractile potential a helically wound member of given cross-sectional area will possess. Many of the numerous well-known thermoplastic materials may be used in the process of the present invention. For example, polyethylene, polypropylene, polystyrene, polybutylene, polyvinylchloride, polyamides, etc.

Figure 2:
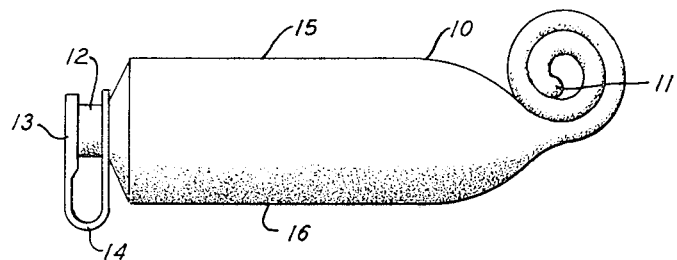
FIG. 2 is a side elevational view of the container of FIG. 1 after a portion of the contents thereof have been dispensed.
Figure 3:
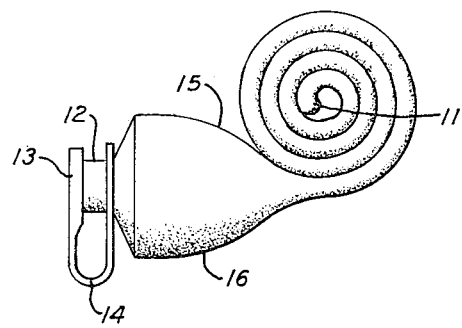
FIG. 3 is a side elevational view of the container of FIG. 2 after the container has been completely evacuated or before being filled.

The heat-set treatment required herein involves heating the coiled container, as shown in FIG. 3, to an elevated temperature above the softening point but below the melting point thereof, typically about 200° C., for a time period sufficient to heat-set the thermoplastic container, which usually ranges up to about five minutes. It will be understood, however, that the specific temperature employed is dependent upon the particular thermoplastic material utilized. Following the generation of a retractile memory in tube 10, the content material is added by any suitable means, thereby resulting in the unwinding of the container and the development of internal forces. The container then has a stopper affixed thereto and is ready for use. Upon opening of the container, the content material is dispensed and the walls automatically collapse, so resulting in coiling of the tube as shown in FIGS. 2 and 3.

I claim:

1. A method for fabricating a collapsible thermoplastic container for fluid material comprising the steps of forming a collapsible thermoplastic container from a thermoplastic material having a high tensile modulus, the container including a chamber defined by a pair of side walls, an end wall and a discharge wall having a container opening, deforming the container into a collapsed helical configuration by winding the thermoplastic container in coil form; and, heating the collapsed helically deformed container to an elevated temperature for a time period sufficient to heat-set the thermoplastic container in a permanent coil configuration, so that any fluid contents filled into such container will be continuously constrained in a direction toward the container opening.

2. A method according to claim 1 wherein the container is heated to a temperature between the softening point and the melting point thereof.

3. A method according to claim 2 wherein the container is heated for a time period of up to about five minutes.

4. A method according to claim 1 wherein the thermoplastic material is polyethylene.

5. A method according to claim 4 wherein the material is heated to a temperature of about 200° C.

6. A method according to claim 1 wherein the thermoplastic material is polypropylene.

7. A method according to claim 1 wherein the thermoplastic material is polyvinylchloride.

8. A method according to claim 1 wherein the thermoplastic material is a polyamide.

9. A method according to claim 1 wherein the thermoplastic material is polystyrene.

References Cited

UNITED STATES PATENTS

| | | | |
|---|---|---|---|
| 2,212,128 | 8/1940 | Richter | 46—44 X |
| 2,643,027 | 6/1953 | Fink | 138—119 X |
| 3,271,490 | 9/1966 | Cattaneo | 264—339 X |
| 3,288,169 | 11/1966 | Moss | 138—118 |
| 3,300,572 | 1/1967 | Dahlgren | 174—69 |

ROBERT F. WHITE, Primary Examiner

R. R. KUCIA, Assistant Examiner

U.S. Cl. X.R.

138—118; 264—339